United States Patent [19]

Nakagaki

[11] 4,346,522

[45] Aug. 31, 1982

[54] DEHYDRATING METHOD FOR A ROOT VEGETABLE AND THE LIKE

[75] Inventor: Sadao Nakagaki, Ueda, Japan

[73] Assignee: Yamajirushi Jozo Co., Ltd., Tokyo, Japan

[21] Appl. No.: 244,540

[22] Filed: Mar. 17, 1981

Related U.S. Application Data

[62] Division of Ser. No. 93,945, Nov. 13, 1979, abandoned.

[51] Int. Cl.³ .......................... F26B 7/00; A23B 4/04
[52] U.S. Cl. ...................................... 34/12; 426/465; 426/640
[58] Field of Search ..................... 34/12; 426/465, 640

[56] References Cited

U.S. PATENT DOCUMENTS

| B 48,560 | 3/1976 | Haas ..................................... 246/281 |
| 1,062,969 | 5/1913 | Harrison ................................. 34/12 |
| 2,087,781 | 7/1937 | Randolph ........................... 34/12 X |
| 3,190,761 | 6/1965 | Hazeldine et al. .................... 99/204 |

FOREIGN PATENT DOCUMENTS 1017519  7/1963  United Kingdom ........... 426/465 X

OTHER PUBLICATIONS

Food Manufacture, Jun. 1960, pp. 249–254.

*Primary Examiner*—John J. Camby
*Attorney, Agent, or Firm*—Jordan and Hamburg

[57] ABSTRACT

Dehydrating method for a root vegetable such as a radish, carrot, turnip and the like of which the root is used for food, by providing openings inside a portion of a root vegetable prior to application of a conventional dehydration process wherein moisture included deep inside a portion of a root vegetable can be dehydrated suitably without spoiling of flavor, efficacy ingredients or beauty of the surface.

3 Claims, 4 Drawing Figures

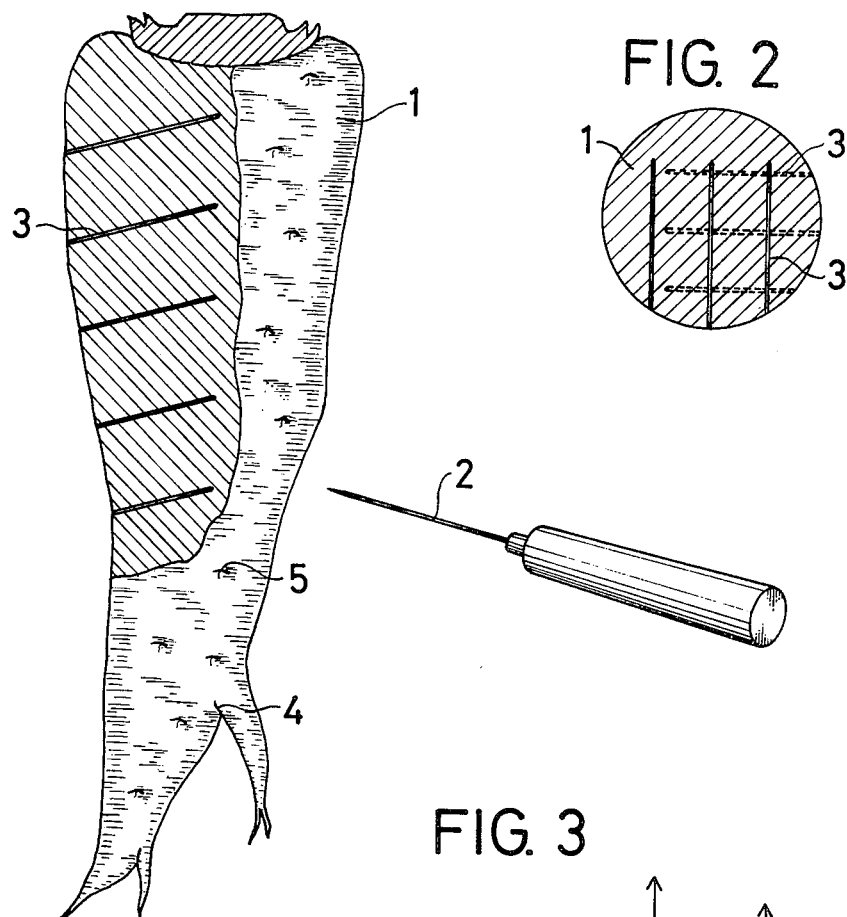
FIG. 1
FIG. 2
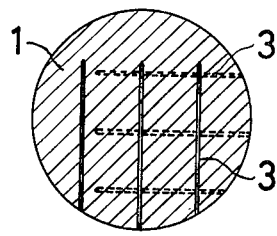
FIG. 3
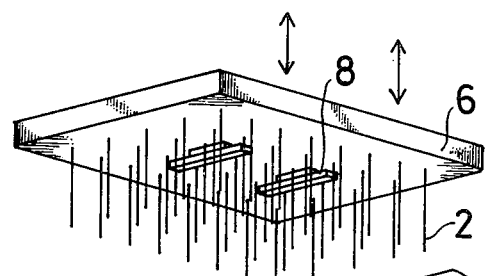
FIG. 4
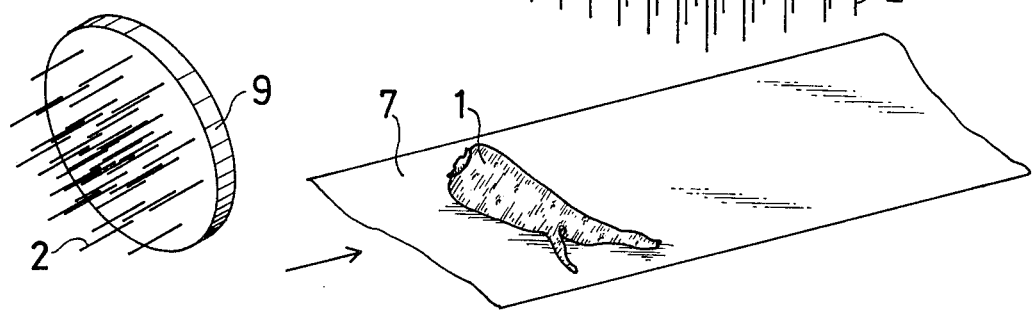

DEHYDRATING METHOD FOR A ROOT VEGETABLE AND THE LIKE

The present application is a divisional application of copending U.S. patent application Ser. No. 93,945, filed Nov. 13, 1979, now abandoned.

This invention relates to a dehydrating method for a root vegetable such as a radish, carrot, turnip and the like of which a root portion is used mainly for food.

Conventionally, there are several kinds of well known dehydrated vegetables, many of which are dehydrated through a process of a well known (vacuum) freeze drying method after a cutting process to cut a vegetable in pieces. However, it is difficult to apply conventional methods directly to root vegetables such as a radish, a carrot and the like which should be dehydrated without a cutting through process. Because such root vegetables are fleshy, accordingly deep inside portions thereof cannot be dehydrated easily and suitably compared with surface side portions thereof. Under influence of such remained moisture deep inside, vegetables alway get musty, rot, or lose flavor. For avoiding these disadvantages, moisture in deep inside portions of vegetables should be dehydrated as same as surface side portions thereof. However, this process should be done over a long time, and dehydrating efficiency is in low levels. However, this process causes loss of flavor, destroys efficacy of ingredients, and increases prime costs.

The present invention has been created to overcome the above disadvantages, and the first object of the present invention is to disclose a method for dehydrating a fleshy root vegetable by which moisture in deep inside portions thereof can be dehydrated in a short time without flavor or efficacy ingredients being spoiled.

The second object of the present invention is to disclose a method for keeping a root of hair or surface of a root soft which is hardened when a dehydrating method is applied.

These and other objects as well as merits of the present invention will be apparent from the following detailed description of embodiments with reference to the accompanying drawings, wherein FIG. 1 is a partially broken view showing a carrot applied as an embodiment of the present invention, FIG. 2 is a section view thereof, FIG. 3 is an isometric view showing an other embodiment of the present invention, and FIG. 4 is a isometric view showing an other embodiment of an opener.

In FIG. 1, numeral 1 represents a carrot as one of a root vegetable, which has been washed out and dried naturally in advance. Numeral 2 represents an opener such as a needle having about one millimeter in diameter, by which openings 3 are opened toward the inside portion of a carrot at suitable intervals. An angle and position of thrusting the needle 2 into a carrot should be given consideration to avoid spoiling the beauty of surface of a carrot. For this purpose, it is better that the openings are opened at crotch portions 4 of roots or portions 5 on which roots of hair are grown.

In case it is unnecessary to give consideration to the beauty of surface, as shown in FIG. 2, openings 3 and 3 may be opened in fretwork to increase dehydrating efficiency.

As described above, it is desired that opening work is done manually by the opener 2 having a single needle to avoid spoiling the beauty of surface of a root vegetable. However, in case it is unnecessary to give consideration to the beauty of surface, an opening apparatus shown in FIG. 3 can be used. Namely, this apparatus comprises a base plate 6 on which many needles 2 and removers 8 are fixed, and a conveyor 7 supplying a root vegetable continuously toward the underside of the base plate 6. By this apparatus, to a root vegetable supplied through the conveyer 7, many openings are opened in a time, and the root vegetable is removed by movement of the remover 8 from the base plate 6.

Moreover, in case opening work is done manually and it is unnecessary to give consideration to the beauty of surface, an opener having many needles 2 fixed on the base plate 9 may be used as shown in FIG. 4.

Next, a process will be described for keeping a root vegetable soft which is hardened when a dehydrating process is applied.

A surface of a root, especially roots borne on a main root, is easily hardened by application of the dehydrating process. This problem includes the following disadvantages, namely long process time is required to revive a soft dehydrated root. Moreover, slender roots thereof fall off easily when they are in transit.

For overcoming these disadvantages, it is desired that alcohol having a suitable concentration is sprayed on a surface and on especially slender roots borne on a root vegetable in which the dehydrating process is over, and then said root vegetable is wrapped in a pouch made of polyethylene or the like to avoid evaporation of alcohol. However, this process may be applied to a dehydrated root vegetable, according to the consideration of a kind, type, or shape of a root vegetable, a preserved period and method, a kind of container or transportation thereof and other conditions.

In the present invention, the above mentioned opening process is applied before the dehydrating process. Accordingly, a conventional freezing dry method or other dehydrating method can be easily applied without a cutting through process to a root vegetable being fleshy to which it is difficult to apply said conventional method directly. And, because the above process keeping a root soft is applied to a root vegetable after the dehydrating process is over, the revival process may be done in a short time, and it is easy to avoid spoiling slender parts of a root.

Moreover, this method of the present invention is applicable not only to a root used for food but also to a root used for medicine such as panax schin-seng which should be dehydrated without spoiling efficient ingredients.

What is claimed is:

1. A method for dehydrating a panax ginseng which comprises
   (A) manually inserting a single needle into the panax ginseng a plurality of times in at least one of the crotch portions of the panax ginseng and the portions of the panax ginseng on which hair grows to improve dehydration of the interior of the panax ginseng,
   (B) dehydrating the punctured panax ginseng, and
   (C) spraying alcohol on the panax ginseng after dehydration has been completed to re-soften the panax ginseng which is hardened during the dehydration process.

2. The method of claim 1 wherein the holes punctured in the panax ginseng are about one millimeter in diameter.

3. The method of claim 1 which additionally comprises
   (D) wrapping said panax ginseng in a pouch to prevent evaporation of the alcohol.

* * * * *